United States Patent
Choi et al.

(10) Patent No.: US 8,498,314 B2
(45) Date of Patent: Jul. 30, 2013

(54) CLOCK OPERATING METHOD AND APPARATUS FOR SUPPORTING ETHERNET PHYSICAL LAYER INTERFACES

(75) Inventors: Woo Young Choi, Daejeon (KR); Tae Sik Cheung, Daejeon (KR); Jea Hoon Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 394 days.

(21) Appl. No.: 12/882,870

(22) Filed: Sep. 15, 2010

(65) Prior Publication Data
US 2011/0150007 A1   Jun. 23, 2011

(30) Foreign Application Priority Data
Dec. 21, 2009   (KR) .................. 10-2009-0128076

(51) Int. Cl.
  *H04J 3/06*   (2006.01)
  *H04L 7/00*   (2006.01)
(52) U.S. Cl.
  USPC ........... 370/503; 370/252; 370/254; 398/155; 375/354
(58) Field of Classification Search
  USPC .................. 398/154, 155; 370/252, 254, 255, 370/503; 375/354, 356, 362
  See application file for complete search history.

(56) References Cited

U.S. PATENT DOCUMENTS

| | | | |
|---|---|---|---|
| 6,490,329 B2 | 12/2002 | Nguyen et al. | |
| 6,539,049 B1 | 3/2003 | McDonough et al. | |
| 7,180,972 B1* | 2/2007 | Venkata et al. | 375/371 |
| 7,539,200 B2* | 5/2009 | Bedrosian | 370/395.62 |
| 7,873,073 B2* | 1/2011 | Frlan et al. | 370/466 |
| 8,165,258 B2* | 4/2012 | Weng et al. | 375/376 |
| 8,194,704 B2* | 6/2012 | Hamasaki | 370/503 |
| 8,213,436 B2* | 7/2012 | Bedrosian | 370/395.62 |
| 2003/0110344 A1* | 6/2003 | Szczepanek et al. | 711/100 |
| 2004/0028156 A1* | 2/2004 | Sefidvash et al. | 375/346 |
| 2004/0028164 A1* | 2/2004 | Jiang et al. | 375/371 |
| 2008/0037585 A1* | 2/2008 | Feuerstraeter et al. | 370/468 |

FOREIGN PATENT DOCUMENTS

| | | |
|---|---|---|
| KR | 2006-0064481 A | 6/2006 |
| KR | 2006-0113493 A | 11/2006 |
| KR | 2007-0046644 A | 5/2007 |

* cited by examiner

*Primary Examiner* — Chi Pham
*Assistant Examiner* — Ahmed Elallam
(74) *Attorney, Agent, or Firm* — Rabin & Berdo, P.C.

(57) ABSTRACT

Provided is a clock operating method and apparatus for supporting a plurality of Ethernet physical layer interfaces. To provide a network synchronization function in a board of simultaneously accommodating the plurality of Ethernet physical layer interfaces, the clock operating method may include: determining a physical layer interface according to a current network synchronization mode; and generating a clock signal of the determined physical layer interface as a reference signal of another physical layer interface.

9 Claims, 7 Drawing Sheets

CLOCK OPERATING METHOD AND APPARATUS FOR SUPPORTING ETHERNET PHYSICAL LAYER INTERFACES

CROSS-REFERENCE TO RELATED APPLICATION

This application claims the benefit of Korean Patent Application No. 10-2009-0128076, filed on Dec. 21, 2009, in the Korean Intellectual Property Office, the disclosure of which is incorporated herein by reference.

BACKGROUND

1. Field of the Invention

The present invention relates to a clock operating method and apparatus for supporting a plurality of Ethernet physical layer interfaces, and more particularly, to a clock operating method and apparatus that may provide a network synchronization function in a board simultaneously receiving a plurality of physical layer interfaces.

2. Description of the Related Art

In a conventional Ethernet or packet-based network, a clock operating apparatus for supporting a physical layer interface, for example, a network support board may relatively less use a network synchronization function. Thus, many clock operating apparatuses may not provide the network synchronization function.

However, as a Synchronous Time Division Multiplexing (STDM) interface, a Synchronous Optical Network (SONET) interface, and the like are currently developed, Ethernet may need to process a synchronized signal of an interface as above.

Also, with the development of technologies, a link capacity required by a network is increasing. Accordingly, there is a desire for a development of a board that may simultaneously accommodate a plurality of physical layer interfaces such as an existing 1-gigabit interface, a large capacity of interface, for example, a 10-gigabit interface, and the like.

SUMMARY

An aspect of the present invention provides a clock operating method and apparatus for supporting a plurality of Ethernet physical layer interfaces that may convert a clock signal of each physical layer interface to a predetermined reference frequency within a board and thereby simultaneously support a plurality of Ethernet physical layer interfaces, in order to support all of Ethernet physical layer interfaces having different capacities.

Another aspect of the present invention also provides a clock operating method and apparatus for supporting a plurality of Ethernet physical layer interfaces that may support a network synchronization function within an Ethernet board.

According to an aspect of the present invention, there is provided a clock operating apparatus for supporting a plurality of Ethernet physical layer interfaces, the apparatus including: a control block to select a physical layer interface of a network synchronization criterion from a plurality of physical layer interfaces according to a current network synchronization mode; a plurality of interface blocks to output a recovered clock signal from received data of the physical layer interfaces; a first frequency conversion block to convert each output recovered clock signal to a predetermined reference frequency; a clock selector/distributor to select a clock signal of the physical layer interface of the network synchronization criterion from the converted recovered clock signals, and distribute the selected clock signal as a plurality of signals; and a second frequency conversion block to convert the distributed clock signal to a frequency for each physical layer interface, and to output the converted clock signal as a reference signal of each physical layer interface.

Each of the interface blocks may support at least one of a 1-gigabit physical layer interface and a 10-gigabit physical layer interface.

The current network synchronization mode may include at least one of a master mode for selecting, as the network synchronization criterion, an Ethernet line interface from the plurality of physical layer interfaces, a slave mode for selecting, as the network synchronization criterion, an external clock interface interoperating with the clock operating apparatus, and an asynchronous mode not having the network synchronization criterion.

The control block may determine the current network synchronization mode, and may output a selection signal indicating an interface of the network synchronization criterion according to the determined current network synchronization mode.

The control block may further output first conversion information for converting clock signals of the physical layer interfaces to the reference frequency, and second conversion information for converting a signal of the reference frequency to a plurality of frequencies for the plurality of physical layer interfaces.

According to another aspect of the present invention, there is provided a clock operating method for supporting a plurality of Ethernet physical layer interfaces, the method including: determining a physical layer interface according to a current network synchronization mode; and generating a clock signal of the determined physical layer interface as a reference signal of another physical layer interface.

The physical layer interface may include at least one of a 1-gigabit physical layer interface and a 10-gigabit physical layer interface.

The current network synchronization mode may include at least one of a master mode for selecting, as a network synchronization criterion, an Ethernet line interface from the plurality of physical layer interfaces, a slave mode for selecting, as the network synchronization criterion, an external clock interface interoperating with a clock operating apparatus, and an asynchronous mode not having the network synchronization criterion.

The determining may include: outputting first conversion information for converting clock signals of the physical layer interfaces to a predetermined reference frequency, and second conversion information for converting a signal of the reference frequency to a plurality of frequencies for the plurality of physical layer interfaces; and determining the current network synchronization mode, and outputting a selection signal indicating an interface of the network synchronization criterion according to the determined current network synchronization mode.

The generating may include: outputting a recovered clock signal from received data of each physical layer interface; converting the output recovered clock signal to a reference frequency based on first conversion information; selecting, from converted clock signals based on a selection signal, a clock signal output from an interface of a network to synchronization criterion; and converting the selected clock signal to a frequency for each physical layer interface using second conversion information to thereby input the converted clock signal as a reference signal of each physical layer interface.

Effect

According to embodiments of the present invention, a clock operating apparatus may convert a clock signal of each physical layer interface to a predetermined reference frequency and thereby use, and thus may simultaneously support different physical layer interfaces.

Also, according to embodiments of the present invention, a clock operating apparatus may convert, to a reference signal of another physical layer interface, a clock signal of a physical layer interface selected according to a current network synchronization mode and thereby use, and thus may support a network synchronization function within a board.

Also, according to embodiments of the present invention, a network synchronization mode and various clock operation controls may be configured using a selection signal and a field setting. Accordingly, it is possible to simply change and selectively apply a clock operation control.

Also, according to embodiments of the present invention, when supporting different physical layer interfaces, a reference signal for each physical layer interface may be generated using a single reference clock. Accordingly, an individual local clock may be unused for each physical layer interface.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Figure 1:
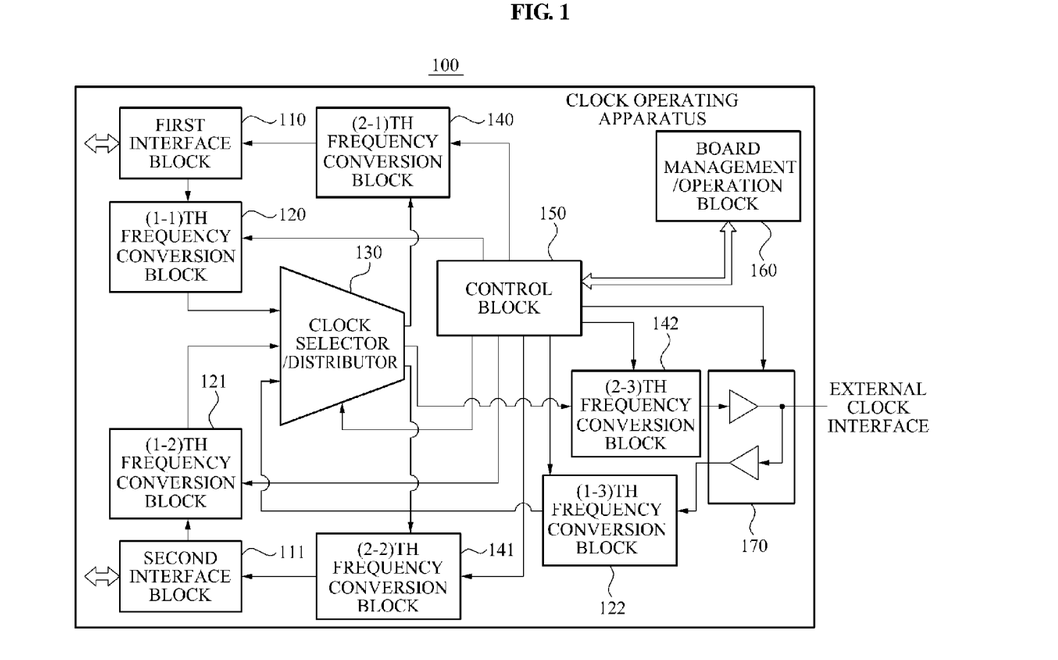
FIG. 1 is a block diagram illustrating a configuration of a clock operating apparatus for supporting a plurality of Ethernet physical layer interfaces according to an embodiment of the present invention.

FIG. 1 is a block diagram illustrating a configuration of a clock operating apparatus 100 for supporting a plurality of Ethernet physical layer interfaces according to an embodiment of the present invention.

Referring to FIG. 1, the clock operating apparatus 100 may include at least one interface block, for example, a first interface block 110 and a second interface block 111, a plurality of first frequency conversion blocks, for example, a $(1\text{-}1)^{th}$ frequency conversion block 120, a $(1\text{-}2)^{th}$ frequency conversion block 121, and a $(1\text{-}3)^{th}$ frequency conversion block 122, a clock selector/distributor 130, and a plurality of second frequency conversion blocks, for example, a $(2\text{-}1)^{th}$ frequency conversion block 140, a $(2\text{-}2)^{th}$ frequency conversion block 141, and a $(2\text{-}3)^{th}$ frequency conversion block 142, a control block 150, and a board management/operation block 160.

The board management/operation block 160 corresponds to a management block of the clock operating apparatus 100, and may read a command input from an operator or an outside to thereby generate an interrupt according to the command. For example, the board management/operation block 160 may obtain a synchronization signal that is input as a network synchronization is initiated or changed, and may transfer, to the control block 150, synchronization information indicating a current network synchronization mode based on the obtained synchronization signal.

In this instance, the current network synchronization mode may include at least one of a master mode for selecting, as a network synchronization criterion, an Ethernet line interface from a plurality of physical layer interfaces, a slave mode for selecting, as the network synchronization criterion, an external clock interface interoperating with the clock operating apparatus 100, and an asynchronous mode not having the network synchronization criterion.

The control block 150 may determine the current network synchronization mode based on synchronization information transferred from the board management/operation block 160, and may select a physical layer interface of the network synchronization criterion based on the determined current network synchronization mode.

For example, the control block 150 may determine the current network synchronization mode, output a selection signal indicating an interface of the network synchronization criterion according to the determined current network synchronization mode, and thereby transfer the selection signal to the clock selector/distributor 130.

Also, the control block 150 may further output first conversion information for converting clock signals of the physical layer interfaces to a predetermined reference frequency, and second conversion information for converting a signal of the reference frequency to a plurality of frequencies for the plurality of physical layer interfaces.

Figure 2:
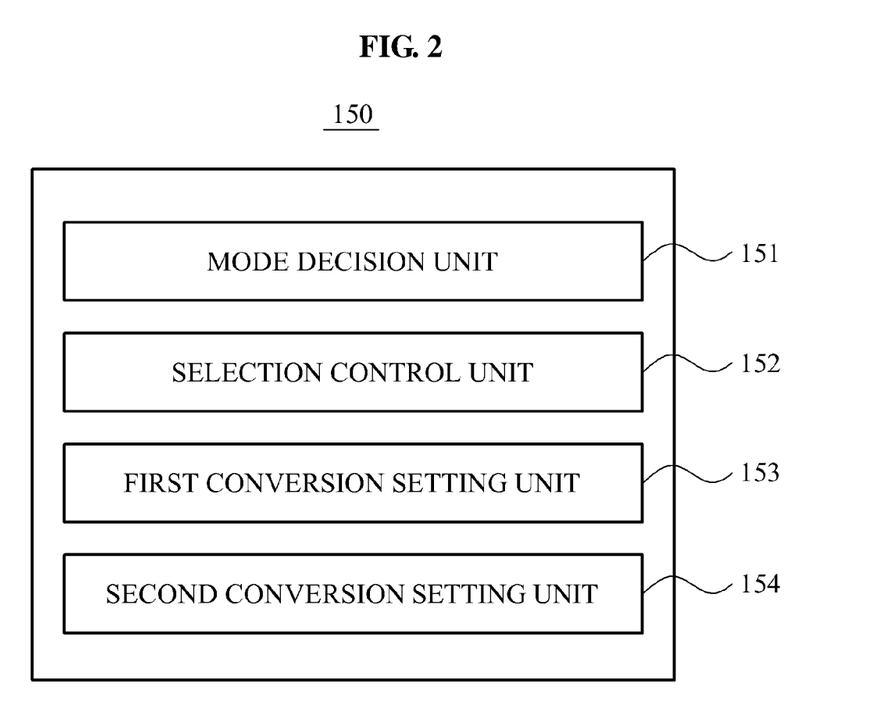
FIG. 2 is a block diagram illustrating a configuration of a control block of FIG. 1.

For this, as shown in FIG. 2, the control block 150 may include a mode decision unit 151, a selection control unit 152, a first conversion setting unit 153, and a second conversion setting unit 154.

The mode decision unit 151 may determine the current network synchronization mode based on synchronization information transferred from the board management/operation block 160.

The selection control unit 152 may generate a selection signal indicating an interface of the network synchronization criterion to be selected based on the determined current network synchronization mode, and may transfer the selection signal to the clock selector/distributor 130.

Also, the selection control unit 152 may generate a control signal for controlling a transfer direction of a bi-directional buffer 170 according to the determined current network synchronization mode.

The first conversion setting unit 153 may generate first conversion information for converting, to a single reference frequency, a recovered clock signal that is output from each physical layer interface, and may transfer the generated first conversion information to the first frequency conversion blocks.

Due to a characteristic of each physical layer interface, the recovered clock signals may be different. Thus, the first conversion setting unit 153 may generate the first conversion information based on a frequency of each physical layer interface. The first conversion information may include a multiplication value and a division value used to convert, to the reference frequency, a frequency signal of each physical layer interface. For example, the first conversion information may include $(1\text{-}1)^{th}$ conversion information, $(1\text{-}2)^{th}$ conversion information, and $(1\text{-}3)^{th}$ conversion information. The $(1\text{-}1)^{th}$ conversion information may include a multiplication value and a division value used to convert, to the reference frequency, a frequency signal of a 10-gigabit physical layer interface. The $(1\text{-}2)^{th}$ conversion information may include a multiplication value and a division value used to convert, to the reference frequency, a frequency signal of a 1-gigabit physical layer interface. The $(1\text{-}3)^{th}$ conversion information may include a multiplication value and a division value used to convert, to the reference frequency, a frequency signal for an external clock interface.

The second conversion setting unit 154 may generate second conversion information for converting a clock signal of the reference frequency to a frequency of each physical layer interface, and may transfer the generated second conversion information to the second frequency blocks.

A reference signal for each physical layer interface may be different for each physical layer interface. Thus, the second conversion setting unit 154 may generate the second conversion information based on the frequency of each physical layer interface.

The second conversion information may include a multiplication value for converting a signal of the reference frequency to the frequency for each physical layer interface. For example, the second conversion information may include $(2\text{-}1)^{th}$ conversion information, $(2\text{-}2)^{th}$ conversion information, and $(2\text{-}3)^{th}$ conversion information. The $(2\text{-}1)^{th}$ conversion information may include a multiplication value used to convert the signal of the reference frequency to a frequency of the 10-gigabit physical layer interface. The $(2\text{-}2)^{th}$ conversion information may include a multiplication value used to convert the signal of the reference frequency to a frequency of the 1-gigabit physical layer interface. The $(2\text{-}3)^{th}$ conversion information may include a multiplication value used to convert the signal of the reference frequency to a frequency for the external clock interface.

The plurality of interface blocks, for example, the first interface block 110 and the second interface block 111 may be connected to corresponding physical layer interfaces (not shown) over a communication network (not shown), and thereby may output a recovered clock signal from received data of the respective corresponding physical layer interfaces.

Each of the interface blocks may use a reference clock signal that is input according to a network synchronization mode when transmitting and receiving data using each physical layer interface.

Each of the interface blocks may be configured to support an Ethernet physical layer interface such as the 10-gigabit physical layer interface, the 1-gigabit physical layer interface, and the like.

For this, the plurality of blocks may include the first interface block 110 and the second interface block 111.

The first interface block 110 may interoperate with the 10-gigabit physical layer interface, and the second interface block 111 may interoperate with the 1-gigabit physical layer interface.

Specifically, the first interface block 110 may output a recovered clock signal from received data of the 10-gigabit physical layer interface, and the second interface block 111 may output a recovered clock signal from received data of the 1-gigabit physical layer interface. The first interface block 110 or the second interface block 111 may transfer, as a reference signal of each physical layer interface, a clock signal input from the $(2\text{-}1)^{th}$ frequency conversion block 140 and the $(2\text{-}2)^{th}$ frequency conversion block 141 or the external clock interface.

The clock operating apparatus 100 may include a bi-directional buffer 170 for interoperation with the connected external clock interface.

The bi-directional buffer 170 may control a transfer direction of clock signal according to an input control signal. Accordingly, the bi-directional buffer 170 may transfer, to the $(1\text{-}3)^{th}$ frequency conversion block 122, a clock signal received from the external clock interface, or may transfer, to the external clock interface, a clock signal received from the $(2\text{-}5)^{th}$ frequency conversion block 142.

Each of the first frequency conversion blocks, for example, the $(1\text{-}1)^{th}$ frequency conversion block 120, the $(1\text{-}2)^{th}$ frequency conversion block 121, and the $(1\text{-}3)^{th}$ frequency conversion block 122 may receive first conversion information output by the control block 150, and thereby convert, to the reference frequency, the recovered clock signal output by each interface block, and the clock signal transferred from the bi-directional buffer 170. In this instance, the converted recovered clock signal may be transferred to the clock selector/distributor 130.

The reference frequency may be, for example, 8 kHz, 19.44 MHz, a frequency designated by a user, and the like. Generally, the recovered clock signal output from each interface block may have a high frequency of hundreds of MHz. Thus, each of the first frequency conversion blocks, for example, the $(1\text{-}1)^{th}$ frequency conversion block 120, the $(1\text{-}2)^{th}$ frequency conversion block 121, and the $(1\text{-}3)^{th}$ frequency conversion block 122 may decrease the high frequency of the recovered clock signal of each corresponding physical layer interface to be a reference frequency less than or equal to tens of MHz, based on the first conversion information.

For this, as shown in FIG. 1, the first frequency conversion blocks may include the $(1\text{-}1)^{th}$ frequency conversion block 120, the $(1\text{-}2)^{th}$ frequency conversion block 121, and the $(1\text{-}3)^{th}$ frequency conversion block 122.

The $(1\text{-}1)^{th}$ frequency conversion block 120 may obtain a multiplication value and a division value of a signal conversion based on $(1\text{-}1)^{th}$ conversion information of the first conversion information, and may convert, to the reference frequency, the recovered clock signal received from the first interface block 110. The $(1\text{-}2)^{th}$ frequency conversion block 121 may obtain a multiplication value and a division value of a signal conversion based on $(1\text{-}2)^{th}$ conversion information of the first conversion information, and may convert, to the reference frequency, the recovered clock signal received from the second interface block 111. The $(1\text{-}3)^{th}$ frequency conversion block 122 may obtain a multiplication value and a division value of a signal conversion based on $(1\text{-}3)^{th}$ conversion information of the first conversion information, and may convert, to the reference frequency, the clock signal of the bi-directional buffer 170.

Accordingly, all the clock signals output from the first frequency conversion blocks, for example, the $(1\text{-}1)^{th}$ frequency conversion block 120, the $(1\text{-}2)^{th}$ frequency conversion block 121, and the $(1\text{-}3)^{th}$ frequency conversion block 122 may have the same frequency.

The clock selector/distributor 130 may select a clock signal of an interface of the network synchronization criterion from clock signals converted by the first frequency conversion blocks, for example, the $(1\text{-}1)^{th}$ frequency conversion block 120, the $(1\text{-}2)^{th}$ frequency conversion block 121, and the $(1\text{-}3)^{th}$ frequency conversion block 122, and may distribute the selected clock signal as a plurality of signals.

In this instance, the clock selector/distributor 130 may select the clock signal of the network synchronization criterion based on the selection signal received from the control block 150, distribute the selected clock signal as the plurality of signals, and thereby transfer the plurality of signals to the $(2-1)^{th}$ frequency conversion block 140, the $(2-2)^{th}$ frequency conversion block 141, and the $(2-3)^{th}$ frequency conversion block 142, respectively.

Accordingly, when the current network synchronization mode corresponds to the master mode of the 10-gigabit physical layer interface, the clock selector/distributor 130 may select a clock signal of the 10-gigabit physical layer interface. When the current network synchronization mode corresponds to the master mode of the 1-gigabit physical layer, the clock selector/distributor 130 may select a clock signal of the 1-gigabit physical layer interface. When the current network synchronization mode corresponds to the slave node, the clock selector/distributor 130 may select a clock signal of the external clock interface.

Each of the second frequency conversion blocks, for example, the $(2-1)^{th}$ frequency conversion block 140, the $(2-2)^{th}$ frequency conversion block 141, and the $(2-3)^{th}$ frequency conversion block 142 may convert the clock signal of the same frequency to a frequency for each physical layer interface, and thereby output the same as a required reference signal of each interface.

For a signal conversion of each interface, the second frequency conversion blocks may include the $(2-1)^{th}$ frequency conversion block 140 connected to the first interface block 110, the $(2-2)^{th}$ frequency conversion block 141 connected to the second interface block 111, and the $(2-3)^{th}$ frequency conversion block 142 connected to the bi-directional buffer 170.

Here, the $(2-1)^{th}$ frequency conversion block 140 may generally have a Phase-Locked Loop (PLL) function, and may convert, to a frequency for the 10-bit physical layer interface, the clock signal input from the clock selector/distributor 130, based on $(2-1)^{th}$ conversion information of the control block 150. Similarly, the $(2-2)^{th}$ frequency conversion block 141 may convert, to a frequency for the 1-gigabit physical layer interface, the clock signal input from the clock selector/distributor 130, based on $(2-2)^{th}$ conversion information of the control block 150. The $(2-3)^{th}$ frequency conversion block 142 may convert, to a frequency for the external clock interface, the clock signal input from the clock selector/distributor 130, based on $(2-3)^{th}$ conversion information of the control block 150.

Accordingly, even though all the clock signals output from the clock selector/distributor 130 may correspond to the same frequency, the clock signals output from the second frequency conversion blocks 140, 141, and 142 may correspond to different frequencies for each interface block.

Figure 3:
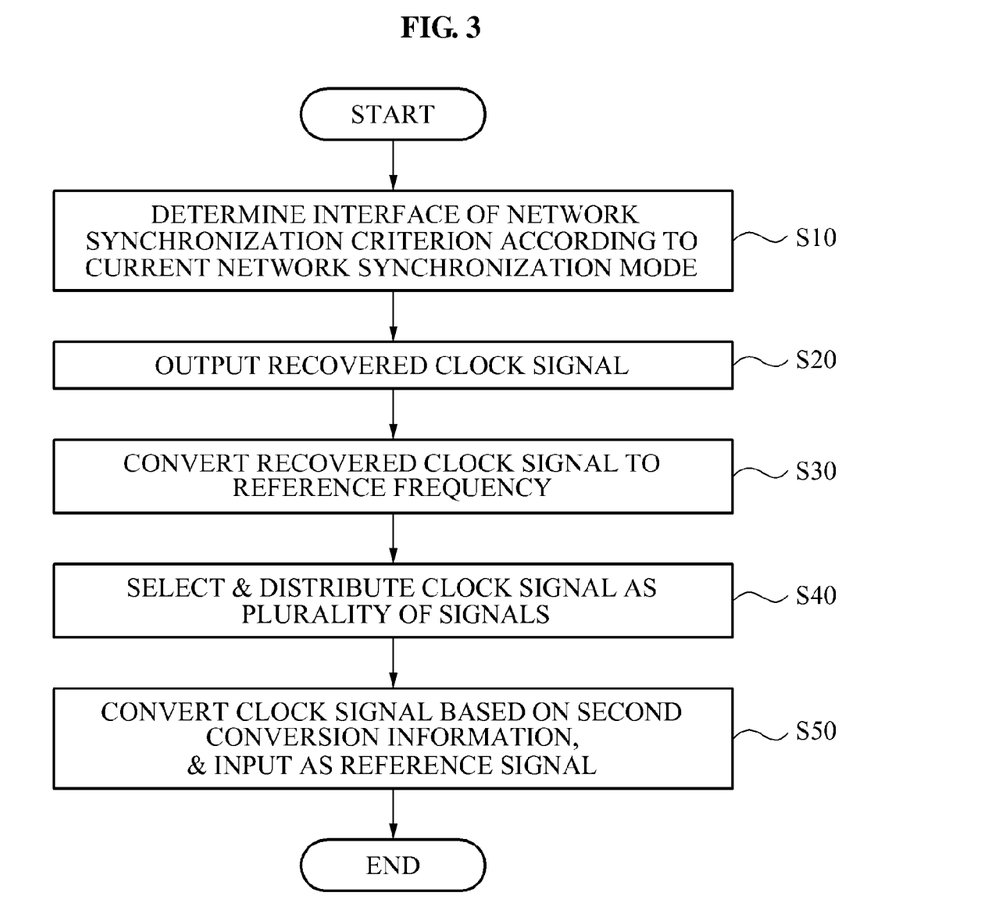
FIGS. 3 and 4 are flowcharts illustrating an operating method of the clock operating apparatus of FIG. 1 according to an embodiment of the present invention.
Figure 4:
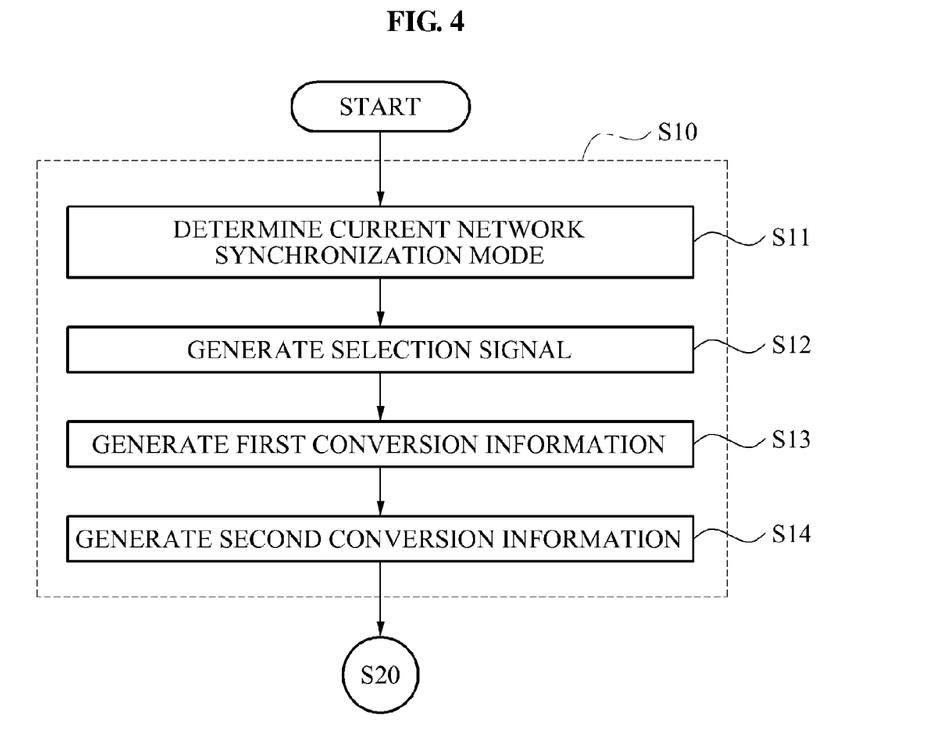

FIGS. 3 and 4 are flowcharts illustrating an operating method of the clock operating apparatus 100 of FIG. 1 according to an embodiment of the present invention.

Referring to FIG. 3, in operation S10, the control block 150 may determine an interface of a network synchronization criterion according to a current network synchronization mode. The control block 150 may output a selection signal for selecting the interface of the determined network synchronization criterion, and first conversion information and second conversion information for a frequency conversion.

The operation of the control block 150 may be performed through operations S11 through S14 of FIG. 4.

Referring to FIG. 4, in operation S11, the mode decision unit 151 may determine the current network synchronization mode based on synchronization mode that is transferred from the board management/operation block 160.

In operation S12, the selection control unit 152 may generate the selection signal indicating the interface of the network synchronization criterion according to the current network synchronization mode, based on the determined current network synchronization mode. The selection control unit 152 may transfer the generated selection signal to the clock selector/distributor 130.

In operation S13, the first conversion setting unit 153 may generate the first conversion information for converting, to a single reference frequency, a clock signal of the frequency of each physical layer interface, and may transfer the generated first conversion information to the first frequency conversion blocks, respectively.

In operation S14, the second conversion setting unit 154 may generate the second conversion information for converting a clock signal of the reference frequency to the frequency of each physical layer interface, and may transfer the generated second conversion information to the second frequency conversion blocks, respectively.

When data is received from a connected physical layer interface, each interface block may output a predetermined recovered clock signal based on the received data in operation S20. Also, when a clock signal is received from the external clock interface, the bi-directional buffer 170 may transfer the received clock signal to the $(1-3)^{th}$ frequency conversion block 122.

In operation S30, each of the first frequency conversion blocks may convert, to the reference frequency, a recovered clock signal output in operation S20 based on the first conversion information.

In operation S40, the clock selector/distributor 130 may select a clock signal of an interference of the network synchronization criterion from the converted recovered clock signals, using the selection signal, and may distribute the clock signal into a plurality of signals.

In operation S50, each of the second frequency conversion blocks may convert the distributed clock signal to a frequency of each physical layer interface based on the second conversion information, and may input the converted clock signal as a reference signal of each interface block.

Figure 5:
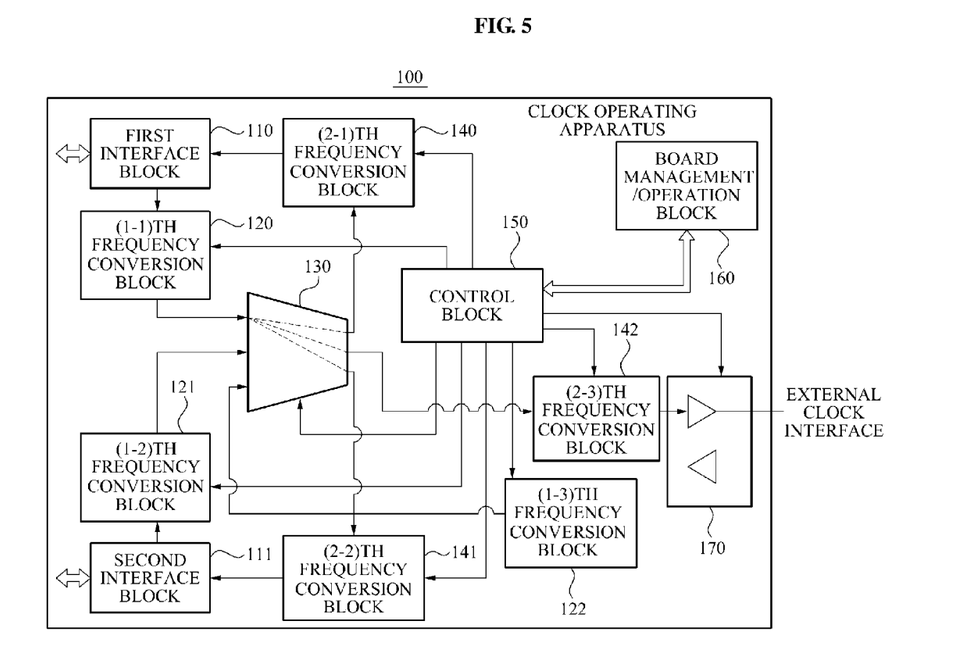
FIGS. 5, 6, and 7 are diagrams to describe an operation of the clock operating apparatus of FIG. 1 for each network synchronization mode according to an embodiment of the present invention.

FIG. 5 is an exemplary diagram to describe an operation of the clock operating apparatus 100 of FIG. 1 according to an embodiment of the present invention.

Here, it is assumed that a current network synchronization mode corresponds to a master mode of a 10-gigabit physical layer interface. In addition, it is assumed that a recovered clock signal of the 10-gigabit physical layer interface corresponds to 161.1328125 MHz, and a reference signal of the 10-gigabit physical layer interface corresponds to 156.25 MHz. Also, it is assumed that a recovered clock signal of a 1-gigabit physical layer interface corresponds to 31.25 MHz, and a reference signal of the 1-gigabit physical layer interface corresponds to 125 MHz. Also, it is assumed that a reference frequency to be used within a board and a clock frequency of an external clock interface is 15.625 MHz.

Referring to FIG. 5, the control block 150 may determine the current network synchronization mode as the master mode of the 10-gigabit physical layer interface, based on synchronization information that is transferred from the board management/operation block 160.

The control block 150 may generate and output a selection signal for selecting a clock signal of the 10-gigabit physical layer interface, first conversion information for converting the clock signal of each physical layer interface to a single reference frequency, and second conversion information for converting the signal of the reference frequency to the frequency for each physical layer interface.

For example, so as to convert the clock signal of each physical layer interface to the single reference frequency, that is, 15.625 MHz, the control block 150 may generate $(1\text{-}1)^{th}$ conversion information including a multiplication value ($\times 640$) and a division value ($/66$) for converting the signal of the 10-gigabit physical layer interface to the reference frequency, $(1\text{-}2)^{th}$ conversion information including a multiplication value ($\times 1$) and a division value ($/2$) for converting the signal of the 1-gigabit physical layer interface to the reference frequency, and $(1\text{-}3)^{th}$ including a multiplication value ($\times 1$) and a division value ($/1$) for converting the signal of the external clock interval to the reference frequency. The control block 150 may transfer the $(1\text{-}1)^{th}$ conversion information to the $(1\text{-}1)^{th}$ frequency conversion block 120, may transfer the $(1\text{-}2)^{th}$ conversion information to the $(1\text{-}2)^{th}$ frequency conversion block 121, and may transfer the $(1\text{-}3)^{th}$ conversion information to the $(1\text{-}3)^{th}$ frequency conversion block 122.

Also, so as to convert the signal of the reference frequency, that is, 15.625 MHz to a frequency for each physical layer interface, the control block 150 may generate $(2\text{-}1)^{th}$ conversion information including a multiplication value ($\times 10$) for converting the signal of the reference frequency to the frequency of the 10-gigabit physical layer interface, $(2\text{-}2)^{th}$ conversion information including a multiplication value ($\times 8$) for converting the signal of the reference frequency to the frequency of the 1-gigabit physical layer interface, and $(2\text{-}3)^{th}$ conversion information including a multiplication value ($\times 1$) for converting the signal of the reference frequency to the frequency of the external clock interface. The control block 150 may transfer the $(2\text{-}1)^{th}$ conversion information to the $(2\text{-}1)^{th}$ frequency conversion block 140, may transfer the $(2\text{-}2)^{th}$ conversion information to the $(2\text{-}2)^{th}$ frequency conversion block 141, and may transfer the $(2\text{-}3)^{th}$ conversion block to the $(2\text{-}3)^{th}$ frequency conversion block 142.

The first interface block 110 may generate a recovered clock signal of 161.1328125 MHz from received data of the connected 10-gigabit physical layer interface. The $(1\text{-}1)^{th}$ frequency conversion block 120 may convert the recovered clock signal of 161.1328125 MHz to the reference frequency using the multiplication value ($\times 640$) and the division value ($/66$) included in the $(1\text{-}1)^{th}$ conversion information received from the control block 150, and then transfer the converted clock signal to the clock selector/distributor 130.

The second interface block 111 may generate a recovered clock signal of 31.25 MHz from received data of the connected 1-gigabit physical layer interface. The $(1\text{-}2)^{th}$ frequency conversion block 121 may convert the recovered clock signal of 31.25 MHz to the reference frequency using the multiplication value ($\times 1$) and the division value ($/2$) included in the $(1\text{-}2)^{th}$ conversion information received from the control block 150, and then transfer the converted clock signal to the clock selector/distributor 130.

The bi-directional buffer 170 may transfer, to the $(1\text{-}3)^{th}$ frequency conversion block 122, a clock signal received from the connected external clock interface.

The clock selector/distributor 130 may select the clock signal of the first interface block 110 from the transferred clock signals using the selection signal received from the control block 150, and may distribute the selected clock signal as a plurality of same signals, and may transfer the plurality of same signals to the second frequency conversion blocks, respectively.

The second frequency conversion blocks, for example, $(2\text{-}1)^{th}$ frequency conversion block 140, the $(2\text{-}2)^{th}$ frequency conversion block 141, and the $(2\text{-}3)^{th}$ frequency conversion block 142 may convert transferred clock signals based on the second conversion information, and may transfer the converted clock signals to the first interface block 110, the second interface block 111, and the bi-directional buffer 170. For example, the $(2\text{-}1)^{th}$ frequency conversion block 140 may obtain the multiplication value ($\times 10$) from the $(2\text{-}1)^{th}$ conversion information to thereby convert the transferred clock signal to the signal of 156.25 MHz. The $(2\text{-}2)^{th}$ frequency conversion block 141 may obtain the multiplication value ($\times 8$) from the $(2\text{-}2)^{th}$ conversion information to thereby convert the transferred clock signal to the signal of 125 MHz. The $(2\text{-}3)^{th}$ frequency conversion block 142 may obtain the multiplication value ($\times 1$) from the $(2\text{-}3)^{th}$ conversion information to thereby convert the transferred clock signal to the signal of 15.625 MHz.

Specifically, when the current network synchronization mode corresponds to the master mode of the 10-gigabit physical layer interface, the clock signal of the 10-gigabit physical layer interface may be converted to a frequency of another physical layer interface and thereby be used as a reference signal, and thus may support a network synchronization of the 10-gigabit physical layer interface. Similarly, when the current network synchronization mode corresponds to the master mode of the 1-gigabit physical layer interface, the control block 150 may output the selection signal as a signal for selecting the clock signal of the second interface block 111, and thereby enable a clock signal of a second interface to be input as a reference signal of another interface.

Figure 6:
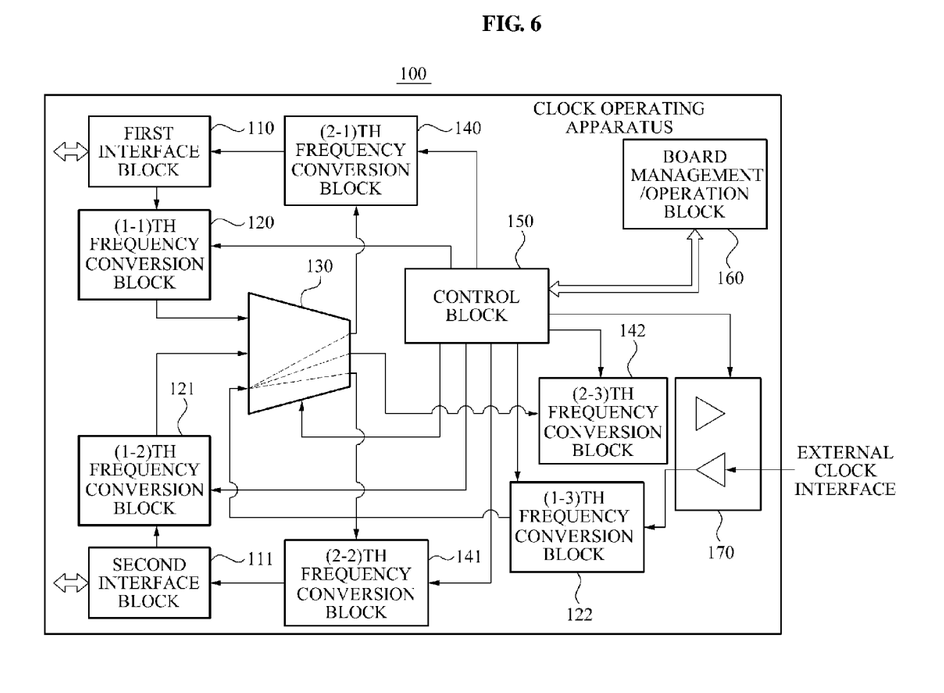

When the current work synchronization mode corresponds to a slave mode for selecting the external clock interface as the network synchronization criterion, the clock operating apparatus 100 may operate as shown in FIG. 6.

Referring to FIG. 6, the control block 150 may generate and output a selection signal for selecting the clock signal of the external clock interface, first conversion information for converting a clock signal of each physical layer interface to a single reference frequency, and second conversion information for converting a signal of the reference frequency to a frequency for each physical layer interface. The control block 150 may set a transfer direction of the bi-directional buffer 170 as a reception direction from the external clock interface.

Accordingly, the bi-directional buffer 170 may transfer, to the clock selector/distributor 130 via the $(1\text{-}3)^{th}$ frequency conversion block 122, a clock signal received from the eternal clock interface. The clock selector/distributor 130 may select, from the plurality of clock signals, the clock signal of the eternal clock interface according to the selection signal and thereby transfer the selected clock signal to the plurality of second frequency conversion blocks, for example, the $(2\text{-}1)^{th}$ frequency conversion block 140, the $(2\text{-}2)^{th}$ frequency conversion block 141, and the $(2\text{-}3)^{th}$ frequency conversion block 142.

Accordingly, the clock signal of the external clock interface may be input as the reference signal of the other physical layer interface.

Figure 7:
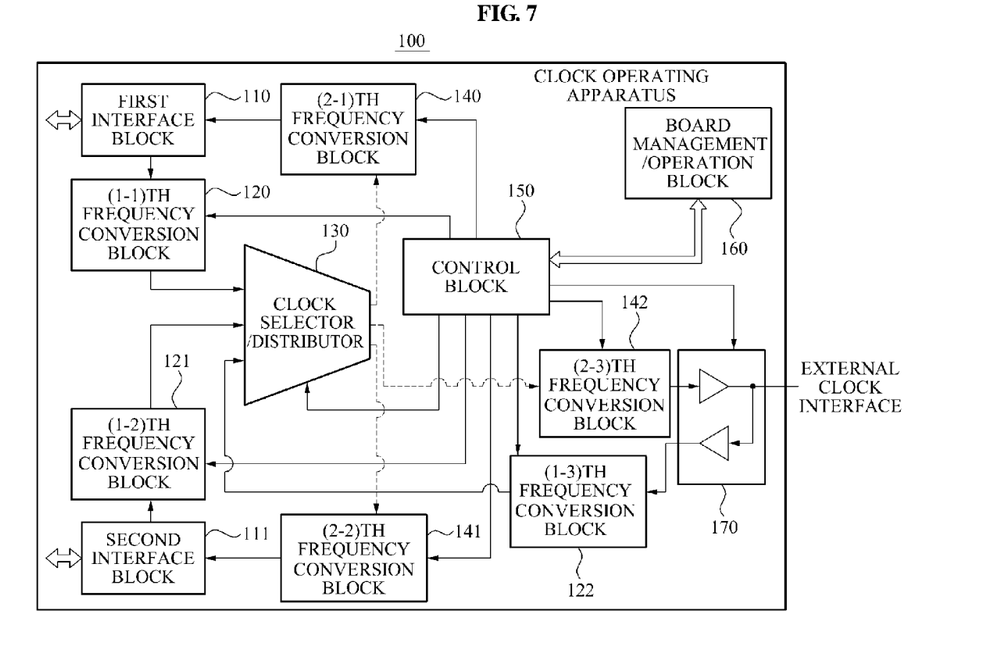

Also, when the current network synchronization mode corresponds to an asynchronous mode, the control block 150 may operate as shown in FIG. 7.

Referring to FIG. 7, the control block 150 may generate and output a selection signal indicating that the clock signal is to not be selected, and first conversion information and second conversion information indicating a signal conversion of a free run.

Accordingly, regardless of the input clock signal, the second frequency conversion blocks, for example, the $(2\text{-}1)^{th}$ frequency conversion block 140, the $(2\text{-}2)^{th}$ frequency conversion block 141, and the $(2\text{-}3)^{th}$ frequency conversion block 142 may generate a predetermined reference signal based on the received second frequency conversion and thereby transfer the generated reference signal to the first interface block 110, the second interface block 111, and the bi-directional buffer 170.

For example, based on second conversion information indicating the signal conversion of the free run, the $(2\text{-}1)^{th}$ frequency conversion block 140 may generate a signal of 156.25 MHz indicating, the $(2\text{-}2)^{th}$ frequency conversion block 141 may generate a signal of 125 MHz, and the $(2\text{-}3)^{th}$ frequency conversion block 142 may generate a clock signal of 15.625 MHz.

Accordingly, the clock signal of each physical layer interface may not be input as the reference signal of the other physical layer interface. Thus, each physical layer interface may operate in an asynchronous mode unassociated with other physical layer interfaces.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A clock operating apparatus for supporting a plurality of Ethernet physical layer interfaces, the apparatus comprising:
   a control block to select a physical layer interface of a network synchronization criterion from a plurality of physical layer interfaces according to a current network synchronization mode;
   a plurality of interface blocks to output a recovered clock signal from received data of the physical layer interfaces;
   a first frequency conversion block to convert each output recovered clock signal to a predetermined reference frequency;
   a clock selector/distributor to select a clock signal of the physical layer interface of the network synchronization criterion from the converted recovered clock signals, and distribute the selected clock signal as a plurality of signals; and
   a second frequency conversion block to convert the distributed clock signal to a frequency for each physical layer interface, and to output the converted clock signal as a reference signal of each physical layer interface.

2. The apparatus of claim 1, wherein each of the interface blocks supports at least one of a 1-gigabit physical layer interface and a 10-gigabit physical layer interface.

3. The apparatus of claim 1, wherein the current network synchronization mode comprises at least one of a master mode for selecting, as the network synchronization criterion, an Ethernet line interface from the plurality of physical layer interfaces, a slave mode for selecting, as the network synchronization criterion, an external clock interface interoperating with the clock operating apparatus, and an asynchronous mode not having the network synchronization criterion.

4. The apparatus of claim 3, wherein the control block determines the current network synchronization mode, and outputs a selection signal indicating an interface of the network synchronization criterion according to the determined current network synchronization mode.

5. The apparatus of claim 4, wherein the control block further outputs first conversion information for converting clock signals of the physical layer interfaces to the reference frequency, and second conversion information for converting a signal of the reference frequency to a plurality of frequencies for the plurality of physical layer interfaces.

6. A clock operating method for supporting a plurality of Ethernet physical layer interfaces, the method comprising:
   determining a physical layer interface according to a current network synchronization mode;
   receiving data of the physical layer interface and recovering a clock signal from the received data;
   converting the recovered clock signal to a clock signal of a reference frequency; and
   converting the clock signal of the reference frequency to clock signals of a plurality of frequencies, each for one of the plurality of Ethernet physical layer interfaces, wherein the current network synchronization mode comprises at least one of a master mode for selecting, as a network synchronization criterion, an Ethernet line interface from the plurality of physical layer interfaces, a slave mode for selecting, as the network synchronization criterion, an external clock interface interoperating with a clock operating apparatus, and an asynchronous mode not having the network synchronization criterion.

7. The method of claim 6, wherein the physical layer interface comprises at least one of a 1-gigabit physical layer interface and a 10-gigabit physical layer interface.

8. The method of claim 6, wherein the generating comprises:
   outputting the recovered clock signal;
   converting the recovered clock signal to the clock signal of the reference frequency based on first conversion information;
   selecting, based on a selection signal, the clock signal of the reference frequency from an interface of a network synchronization criterion; and
   converting the selected clock signal to the signals of the plurality of frequencies using second conversion information.

9. A clock operating method for supporting a plurality of Ethernet physical layer interfaces, comprising:
   determining a physical layer interface according to a current network synchronization mode, including
      outputting first conversion information for converting clock signals of the physical layer interfaces to a predetermined reference frequency, and second conversion information for converting a signal of the reference frequency to a plurality of frequencies for the plurality of physical layer interfaces, and determining the current network synchronization mode, and outputting a selection signal indicating an interface of the network synchronization criterion according to the determined current network synchronization mode; and
generating a clock signal of the determined physical layer interface as a reference signal of another physical layer interface.

* * * * *